United States Patent [19]

Paoletti

[11] Patent Number: 4,763,566
[45] Date of Patent: Aug. 16, 1988

[54] MANUALLY OPERATED COFFEE-MAKING MACHINE

[75] Inventor: Luciano Paoletti, Florence, Italy

[73] Assignee: SPIDEM S.r.l., Milan, Italy

[21] Appl. No.: 5,938

[22] Filed: Jan. 22, 1987

[30] Foreign Application Priority Data

Jan. 22, 1986 [IT] Italy .............................. 19142 A/86

[51] Int. Cl.⁴ .............................................. A47J 31/36
[52] U.S. Cl. ...................................... 99/302 P; 99/285
[58] Field of Search ............... 99/279, 302 R, 302 FB, 99/302 P, 303, 285, 287, 297; 426/433

[56] References Cited

U.S. PATENT DOCUMENTS

| 222,402 | 12/1879 | Hawley | 99/302 R |
|---|---|---|---|
| 2,881,692 | 4/1959 | Volcov | 99/302 R |
| 3,518,933 | 7/1970 | Weber | 99/302 R |
| 3,804,635 | 8/1972 | Weber | 99/302 R |

FOREIGN PATENT DOCUMENTS 556926 2/1957 Italy ................................. 99/302 R Primary Examiner—Robert W. Jenkins
Attorney, Agent, or Firm—Birch, Stewart, Kolasch & Birch

[57] ABSTRACT

A manually operated coffee-making machine comprises, water storage reservoir and a hand-operated pump element which extends into the interior of the reservoir. The pump element is actuatable from the exterior of the reservoir. The delivery side of the pumping element is connected to an infusion chamber assembly which accommodates the coffee powder and is in communication with a dispensing tap opening to the exterior of the reservoir. An hydraulic accummulator is also provided. This hydraulic accummulator branches off a conduit connecting the delivery side of the pumping element to the infusion chamber assembly.

8 Claims, 2 Drawing Sheets

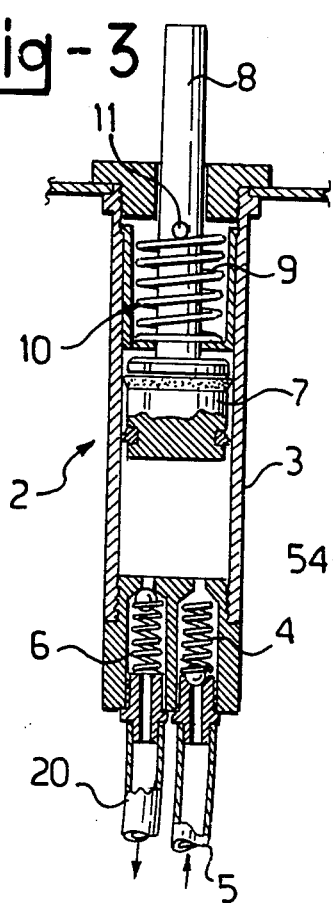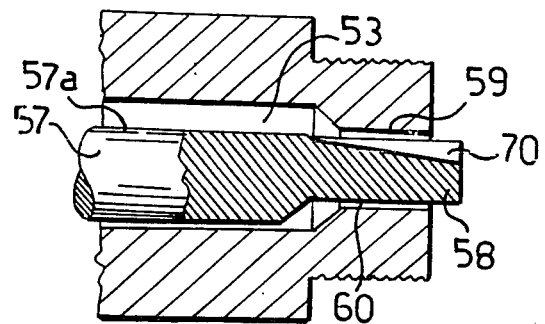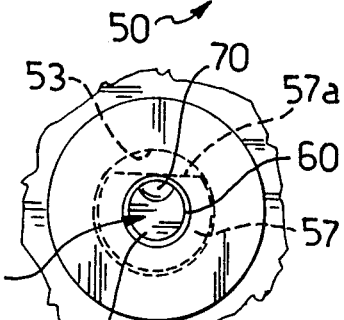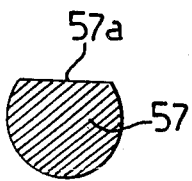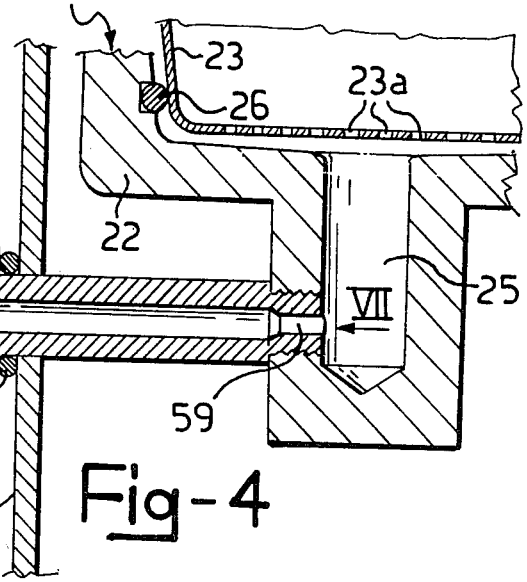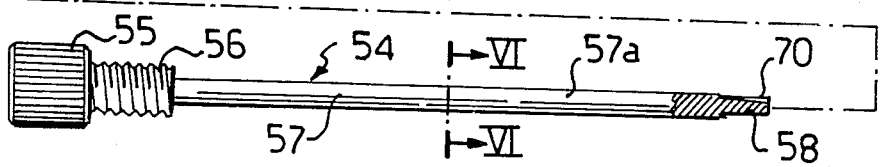

MANUALLY OPERATED COFFEE-MAKING MACHINE

BACKGROUND OF THE INVENTION

This invention relates to a manually operated coffee-making machine.

Currently, there are various types of coffee makers which are based upon mutually different operating principles which are available on the market.

In particular for household use, the so-called "moka-express" coffer maker is traditionally employed which has a water storage reservoir into which a percolator holding funnel dips and which is in communication with a collecting container usually placed on top of the water storage reservoir.

With this embodiment, the coffee percolate forms by the water raising under the thrust from the pressurized steam which is generated above the water within the storage reservoir. Therefore to form the coffee percolate, it becomes necessary to supply the water under pressure, at a temperature which is consequently higher than the temperature of 100° C., the boiling temperature of water at atmospheric pressure.

This design yields coffee which is not always of a high quality, both on account of its being permeated by water at a temperature which is other than optimum for the percolate to form, and because it is impossible to provide a sufficient back pressure opposing the water passage to generate, by the time the water flows through the coffee powder, a comparatively high pressure which can contribute materially to the production of a high quality coffee.

On the other hand, coffee makers for household use, wherein a reservoir, are known usually intended to accommodate cold water therein, is provided from which a pump draws the water and delivers it to a small electrical heating boiler and hence to the percolator holder assembly for percolation to take place.

With this embodiment, one can obtain the desired water pressure without having to reach thermal levels that hinder a proper coffee making procedure. However, considerable difficulties are generally encountered with the thermal control of the assembly because it is impossible or at least very difficult to achieve a proper thermal balance of all the assemblies which contribute to the making of "espresso" coffee. Thus, variations in the quality of the coffee result thereby resulting in the initial coffee dosages being of inferior quality owing to the various assemblies having not yet reached a good thermal balance.

Another drawback of prior coffee makers relates to control of the back pressure opposing delivery of the water under pressure. In particular, the back pressure is applied directly to the cake of powder coffee and is therefore dependent on various external environmental factors, such as the coffee grinding, humidity of air, atmospheric pressure, and so forth.

SUMMARY OF THE INVENTION

It is an aim of this invention to obviate such prior drawbacks by providing a manually operated coffee-making machine which affords virtually immediate thermal balance of all the assemblies which make up the coffee-making machine in order to ensure uniform quality of the dispensed product.

It is another object of the present invention to provide a manually operated coffee-making machine which affords the user with the faculty of controlling at will the back pressure during the dispensing step in order to obtain an adjustable flow rate at the dispensing end yielding the best qualitative values at all times.

A further object of this invention is to provide a coffee maker wherein the water heating is never allowed to exceed the boiling temperature at atmospheric pressure, thus eliminating the need to use thermostats and avoiding the risk inherent with the presence of boilers under pressure.

It is another object of the invention to afford an "espresso" coffee of excellent quality, even without resorting to electric power.

Yet another object of this invention is to provide a manually operated coffee maker which is simple in construction, is easy to operate, and is of curtailed cost.

The above aim, as well as these and other objects to become apparent hereinafter, are achieved by a manually operated coffee-making machine, according to the invention, which is characterized in that it comprises, inside a free surface water storage reservoir, a band-operated pumping element which extends into the interior of said reservoir and is actuatable from the exterior of said reservoir, the delivery side of said pump element being connected to an infusion chamber assembly for the coffee powder housed at least partway in said reservoir and in communication with a dispensing tap opening to the exterior of said reservoir, a pressurized hydraulic accumulator being also provided branching off the conduit connecting the delivery side of said pumping element to said infusion chamber assembly.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Further features and advantages will become apparent from a description of a preferred, though not exclusive, embodiment of a manually operated coffee-making machine, as illustrated by way of example and not of limitation in the accompanying drawings, where:

FIG. 3 is a sectional view of the pumping element;

FIG. 4 is an exploded sectional view of the control tap;

FIG. 5 is an enlarged scale, detail view, showing in section the pin-like extremity of the control tap;

FIG. 6 is a sectional view taken along the line VI—VI in FIG. 4; and

FIG. 7 is view taken from the line VII—VII in FIG. 4.

DETAILED DESCRIPTION OF THE PREFERRED EMBODIMENTS

Figure 1:
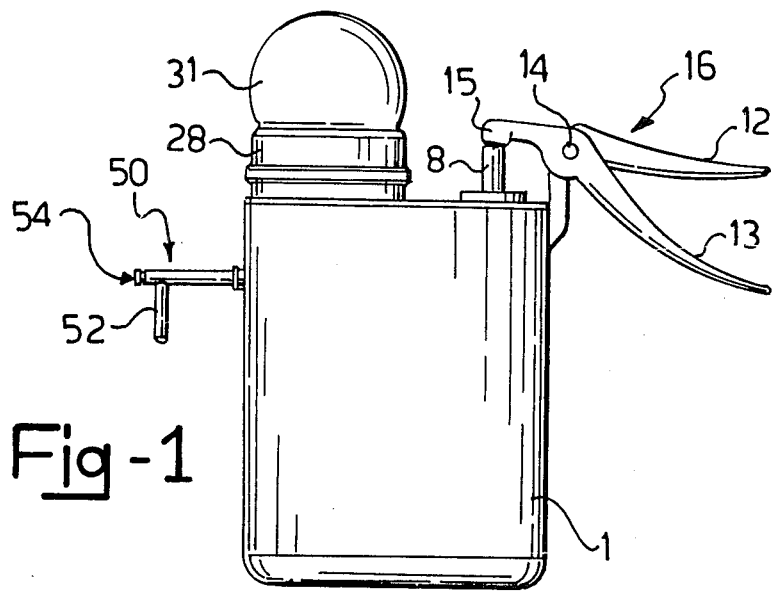
FIG. 1 shows schematic side view of a coffee maker according to the present invention.
Figure 2:
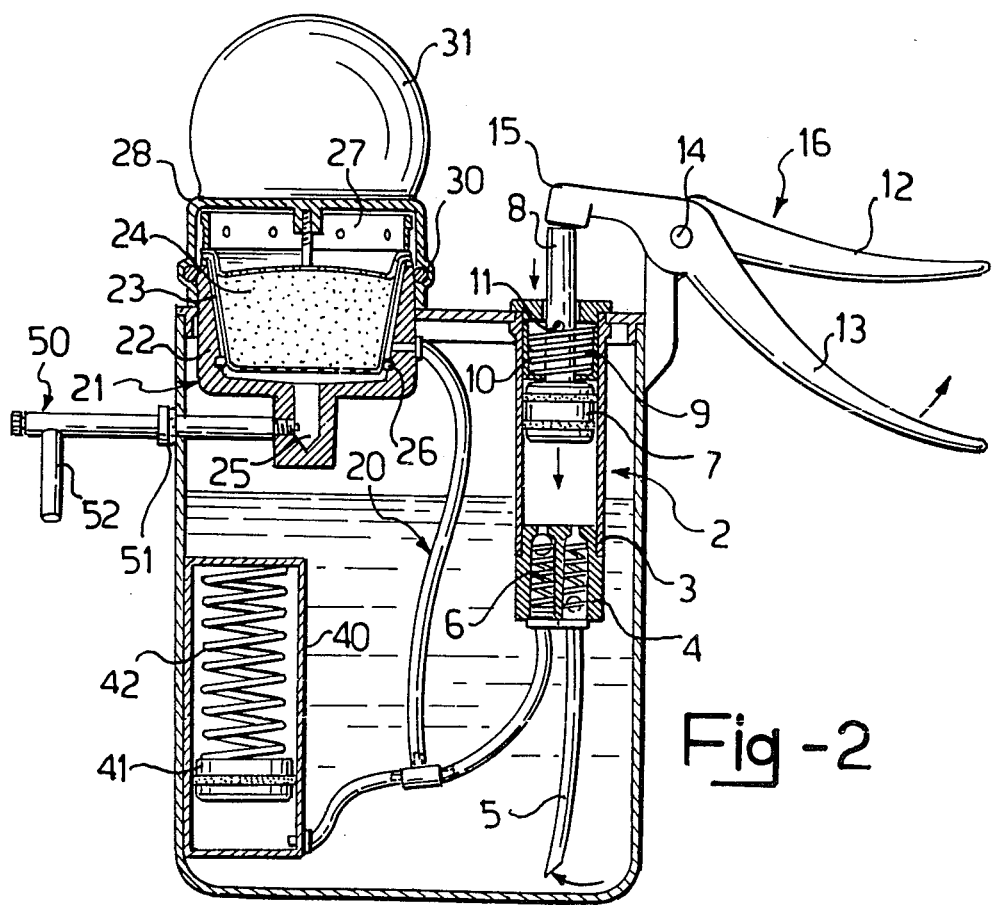
FIG. 2 is a sectional view of the coffee maker showing its component elements.

With reference to the drawing figures, the manually operated coffee-making machine according to the present invention comprises a free-surface water storage reservoir, generally designated by the reference numeral 1, into which heated water can be introduced, or which can be alternatively placed in contact with a heat source, such as a flame heater, or electric plate heater, or the like, to thereby heat the water. The water inside the reservoir, which is in communication with the atmosphere at least at the top, can reach at most boiling temperature at atmospheric pressure, and consequently, is never allowed to become pressurized. It would also be possible, if desired, to arrange for a tight sealed closure in order to obtain steam delivery.

Positioned inside the reservoir 1 is a hand-operated pump element 2 which, in a preferred but not binding embodiment thereof, includes a cylindrical body 3 provided at the bottom with an intake valve 4 connected to a suction conduit 5 and a delivery valve 6. The conduit 5 extends into the reservoir 1 from the bottom of cylindrical body 3. Sealingly movable inside the body 3 is a piston 7 having a piston rod 8 projecting outwardly and being urged elastically during the upward stroke by a spring 9 which acts between a Belleville washer 10, attached to the end of the cylindrical body 3, and a stop peg 11 provided on the rod 8.

The pumping action can be exerted on the piston rod 8 by means of a lever-operated actuator 16 having a fixed lever 12 and a movable lever 13. The fixed lever 12 forms the handgrip element or handle for the coffee maker and the movable lever 13 is journalled scissors-like via a pivot pin 14 to the fixed lever 12. This lever 13 has a thrust end 15 arranged to contact the end of rod 8 to produce the compressive action and consequent downward movement of the piston inside the body 3.

From the delivery valve 7, a connection conduit 20 extends and is in hydraulic communication with an infusion chamber assembly 21 for the coffee powder. This infusion chamber assembly 21 includes body portion 22 housing on its interior a small cup 23 for accommodating the coffee powder, generally indicated at 24.

The body portion 22 is formed with a dispensing channel 25 located underneath the perforated bottom 23a of the cup 23. This channel 25 is sealed from the lateral region of the cup by a seal 26 of the O-ring variety.

The water supplied through the connecting conduit 20 reaches a distribution chamber 27 located above the cup 23 and defined in a cover 28 adapted to be mated sealingly with the body portion 22 with the interposition of a seal 30 of the O-ring variety.

Also connected to the cover 28 is a handgrip 31 of a thermally insulating material, which enables removal of the cover 28.

Branching off the connecting conduit 20 is a hydraulic accumulator 40, wherein an accumulating piston 41 is provided. This piston 41 is biased by an elastic means comprising a calibrated spring 42, which would be generally calibrated for a preferred pressure value of 6-8 atmospheres. The accumulator accumulates water under pressure while the pumping element 2 is being operated, as will be explained hereinafter.

The pump element 2, infusion chamber assembly 21, and hydraulic accumulator 40 are placed inside the reservoir 1 and are in direct contact with the water and/or vapors contained therein. These elements can thereby immediately reach the same thermal level as the water, to thus provide perfect thermal balance for the coffee maker.

The infusion chamber assembly 21 is in communication with the outside through a dispensing tap 50. This tap 50 extends outwardly from the channel 25 with the interposition of a sealing gasket 51 on the wall of the reservoir 1.

The control tap 50 has at its outward end dispensing spouts 52 and defines, on its interior, as shown best in FIG. 4, a substantially cylindrical delivery chambers 53. A shutter 54 is provided in chamber 53 to the control tap 50. The shutter 54 is substantially comprised of a handgrip element 55, accessible from the outside, and connected to a threaded tang 56 adapted to engage a threaded socket 56a defined at the extremity of the delivery chamber 53.

The shutter 54 has a stem-like body 57 adapted to fit inside the chamber 53 and having in cross-section a substantially circular shape, matching the cross-section of the chamber 53, with a circumferential faceted formation 57a.

The stem-like body 57 has, at its free end, a pin 58 which fits into a nozzle 59 whereby the dispensing channel 25 and delivery chamber 53 communicate with each other in a flow rate control relationship.

As indicated in FIG. 7, the pin 58 engages the nozzle 59 with a clearance 60, permitting the coffee powder to be pre-soaked. In actual practice, it is arranged that with the tap in its closed position, i.e. with the shutter 54 threaded fully down into the socket 56a, the pin 58 will not cut the communication off completely but will leave a very small passage open to bleed off air and any steam until the water is admitted completely through the mass of coffee powder to pre-soak it.

To dispense the coffee, it will then be necessary, as explained hereinafter, to gradually open the tap so as to obtain a controlled flow through which production of a real coffee "cream" can best be governed. If desired, the tap may be arranged to open automatically when a preset pressure level is reached, using suitable devices which are known.

In this machine type, the tap is of fundamental importance because it is the throttled "espresso" coffee flow that yields coffee having optimum characteristics. The flow of "cream" coffee or "espresso" coffee is to be regarded as a fluid consisting of chemical substances derived from the dissolved soluble portions plus water, suspended solid particles, and a dense and frothy portion resulting from emulsification of heavy essential oils with the gases released by vaporization of more volatile essential oils retained in the form of gas bubbles.

Taking into consideration the suspended solid particles, these will flock with the liquid flow and may vary in size from tiny to the largest ones whose maximum diameter is substantially the same as the holes in the percolator cup which holds the coffee powder.

If, with an ordinary tap, a sufficient small opening were selected to ensure the required flow rate for "espresso" coffee making, the outlet cross-section area would be but few hundredths of a millimeter high and several millimeters long, and exemplifiable in practice as an elongate slit.

In this hypothetical case, the larger diameter solid particles would not be admitted therethrough, and would shortly clog up the window, preventing the discharge of liquid.

As the tap is opened further, there would occur another selection and subsequent tap clogging when the window freshly opened becomes occluded completely by the larger particles.

As the tap is opened still further, all of the built-up particles could suddenly move through and the coffee-making pressure value would drop completely since back pressure is only provided by the cake of coffee powder.

To obviate this problem in the embodiment just described, the pin 58 is formed with a substantially cylindrical recess 70, provided in a peripheral portion thereof, which has a tapering cross-sectional area from the free end of the pin toward the stem-like body 57.

Thus, a cross-sectional shape is obtained which is as close as possible to the circular one which affords a minimal flow passage for the liquid while allowing maximum flow passage of solid particles through the larger hole.

The pin, despite its uncovering a compact and tiny cross-sectional area, is not liable to being clogged because it is a trough rather than a hole and consequently cannot retain foreign matter and is, hence, self-cleaning.

A similar reasoning applies to the stem-like body 57 which defines a curtailed passage cross-section for the coffee being made, in cooperation with the chamber 53, by virtue of the faceted formation 57a provided on the stem-like body 57.

The faceted formation is also effective to make the tap self-cleaning as stem rotation for opening and closing the tap will automatically clean the chamber.

In actual use of the coffee maker according to the invention, one can introduce water into the reservoir 1 and then arrange for it to be heated, e.g. by taking it close to a heat source which could be a flame heater or the like.

On the water reaching the desired thermal level, one can begin to pump the water by means of the pump element 2, acting on the scissors levers 12 and 13. Water will be drawn from the reservoir 1 and will move under pressure toward the infusion chamber assembly 21.

At this stage, the dispensing tap would be closed and, as explained hereinabove, the only passage is afforded by the clearance between the pin 58 and the nozzle, thereby the coffee powder is pre-soaked with the delivery of water.

Furthermore, the provision of the hydraulic accumulator 40 results in the water being accumulated under pressure within the accumulator 40 by overcoming the spring bias of the spring 42. The accumulating piston 41 is moved upwardly and it is, therefore, unnecessary to keep on pumping because, once the dispensing tap is opened gradually, the required pressure to dispense the coffee can be supplied directly by the accumulator. The accumulator becomes operative to supply the infusion chamber assembly with the water accumulated therein during the manual pumping action.

It should be also emphasized that all the assemblies which comprise the coffee maker immediately acquire the same thermal value, since they bathe in the water present in the reservoir 1, or by the vapors released by that water.

Of great importance for production of a good quality coffee is adjustment of the tap, which, being closed at the start of the pumping action, permits pre-soaking of the coffee powder, and when open to the appropriate extent, allows controlled dispensing to afford "cream" coffee of the best quality.

It should be emphasized that where the user seeks a coffee percolate, the tap can be kept open at once, thus greatly reducing the amount of the back pressure opposing the water passage, the back pressure being solely provided by the powder coffee cake present in the cup 23.

Another important aspect of the invention is that the pumping action can be applied with one hand, without requiring reactive forces to steady the machine body statically and dynamically.

Furthermore, the work related to the product of flow rate by pressure may be performed by successive operations of the pumping element, thereby the process can be carried out easily and effortlessly.

The invention herein is susceptible to many modifications and changes without departing from the instant inventive concept.

All the details, moreover, may be replaced with other, technically equivalent elements.

In practicing the invention, the materials employed, provided that they are compatible with the intended application, as well dimensions and actual forms may be any selected ones contingent on individual requirements.

The invention being thus described, it will be obvious that the same may be varied in many ways. Such variations are not to be regarded as a departure from the spirit and scope of the invention, and all such modifications as would be obvious to one skilled in the art are, intended to be included within the scope of the following claims.

I claim:

1. A manually operated coffee-making machine comprising:
    a water storage reservoir;
    a hand-operated pump element extending from a position exterior of said reservoir into said reservoir, said pump element being actuatable from the exterior of said reservoir;
    an infusion chamber assembly connected to a delivery side of said pump element by a conduit, said infusion chamber assembly housing a coffee powder, said infusion chamber assembly being housed at least partway in said reservoir;
    a control tap for permitting communication between said infusion chamber and the exterior of said reservoir; and
    a pressurized hydraulic accumulator blanching off the conduit connecting the delivery side of said pump element to said infusion chamber.

2. The coffee-making machine as recited in claim 1, wherein said pumping element comprises:
    a cylindrical body having an intake valve and a delivery valve at one end thereof;
    a movable piston provided in said cylindrical body in sealed relationship therewith, said piston having a piston rod projecting from the cylindrical body to the exterior of said reservoir;
    a lever actuator assembly for acting on said piston rod, said actuator assembly having a fixed lever connected to said reservoir and a movable lever journalled scissors-like to said fixed lever, said movable lever contacting a free end of said piston rod projecting from the cylindrical body.

3. The coffee-making machine as recited in claim 1, wherein said hydraulic accumulator contains a movable accumulating piston in sealed relationship therewith and an elastic means for biasing said accumulating piston, said elastic means being calibrated at a preset pressure valve.

4. The coffee-making machine as recited in claim 1, wherein said control tap comprises:
    a cylindrical delivery chamber having a first and second end, said first end having a nozzle and being in communication with a delivery channel of said infusion chamber through said nozzle;

at least one dispensing spout being in communication with the second end of said cylindrical delivery chamber; and a stem-like body being received within said cylindrical delivery chamber, said stem-like body having a pin on one end thereof, said pin being in engagement with said nozzle, said stem-like body being rotatable in said cylindrical delivery chamber to mate a threaded tang affixed to an end of said stem-like body with a threaded socket at an end of said cylindrical delivery chamber.

5. The coffee-making machine as recited in claim 4, wherein said stem-like body has a substantially circular cross-sectional shape generally matching a cross-sectional shape of said cylindrical delivery chamber, said stem-like body further having a faceted formation at a periphery thereof.

6. The coffee-making machine as recited in claim 4, wherein said pin defines a circumferential clearance in cooperation with said nozzle.

7. The coffee-making machine as recited in claim 4, wherein said pin has a recess thereon, said recess being formed substantially peripherally and having a decreasing depth toward said stem-like body.

8. The coffee-making machine as recited in claim 1, wherein said infusion chamber assembly comprises:

a body portion surrounding a cup for accommodating said coffee powder;

a cover for closing said body portion, said cover being located at a top of said body portion, and said cover and body portion defining a distribution chamber; and a handgrip provided on said cover, said handgrip being of a thermally insulating material.

* * * * *